UNITED STATES PATENT OFFICE.

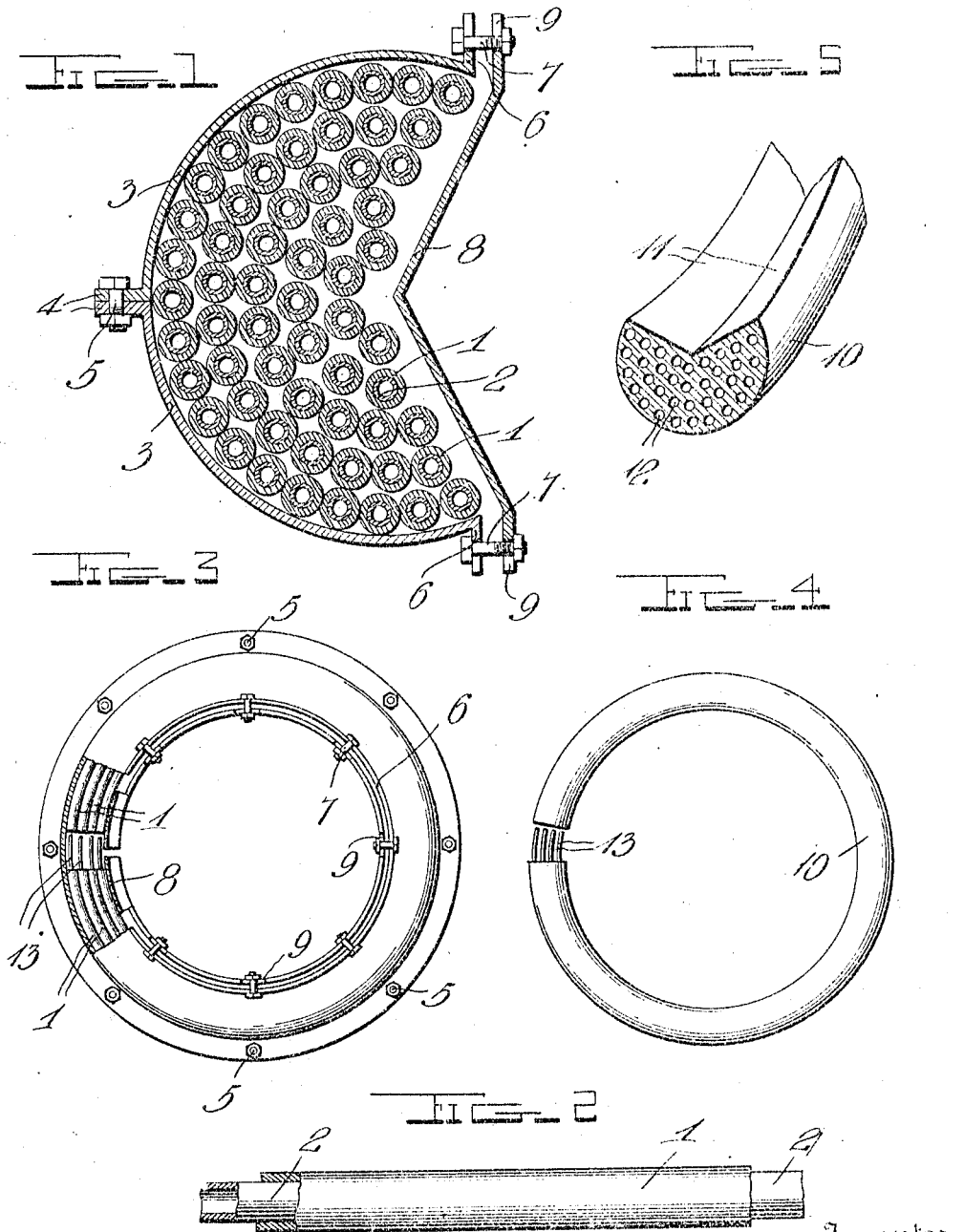

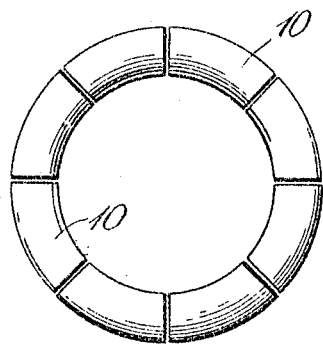
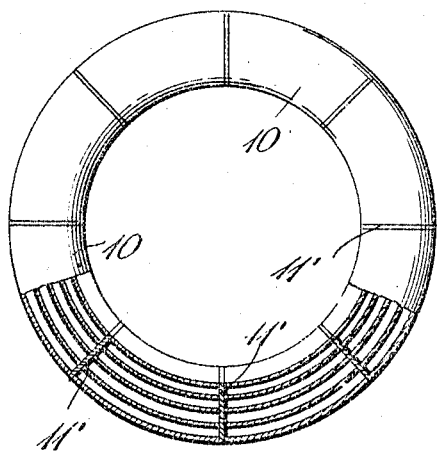
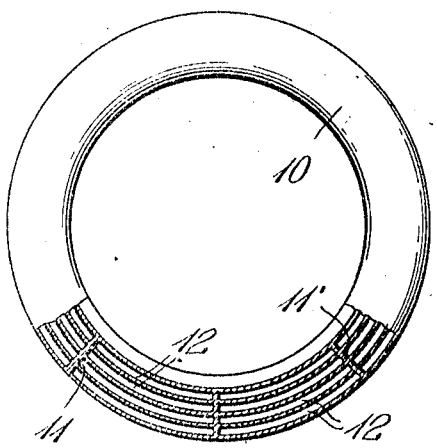
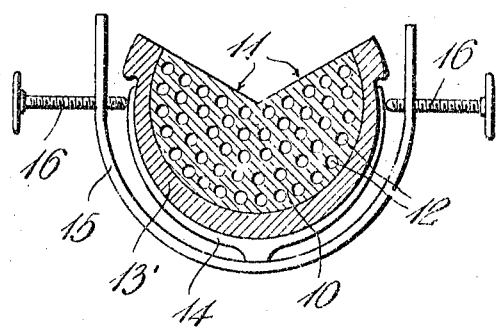
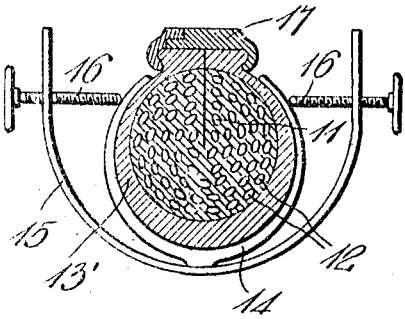

FRED T. ROBERTS, OF NEW YORK, N. Y.

FILLER FOR TIRES.

992,904.  Specification of Letters Patent.  Patented May 23, 1911.

Application filed January 11, 1911. Serial No. 602,015.

*To all whom it may concern:*

Be it known that I, FRED T. ROBERTS, a citizen of the United States, residing at New York, in the county of New York and State of New York, have invented certain new and useful Improvements in Fillers for Tires; and I do declare the following to be a full, clear, and exact description of the invention, such as will enable others skilled in the art to which it appertains to make and use the same.

My invention relates to improvements in tires for automobiles and other vehicles, and more particularly to an improved filler or core adapted for use in a tire casing or shoe, although my invention may be embodied in the tire itself.

The principal object of my invention is to provide a device of this character composed of an annular body of resilient material, such as elastic rubber, provided with airtight cells filled with compressed air or other gas, the cells being entirely independent or non-communicating and formed in an integral annular body.

Another object of my invention is to provide a filler or core of this character which will fit the space within a tire casing, and will contain numerous cells charged with compressed fluid so that the tire will afford the same resiliency as the ordinarily inflated tube tires now in general use, and at the same time will be free from the objections to such tires.

A further object of the invention is to provide a core or filler of the character referred to above having a sector-shape in cross-section and capable of being compressed into substantially circular shape to fit the tire casing, the compression reducing the cross-sectional area of the core and causing the air or gas within its cells to be compressed.

With the above and other objects in view, the invention consists of certain novel features of construction, and the combination and arrangement of parts as will be more fully described and claimed.

In the accompanying drawings I have illustrated one practical embodiment of my invention and one method or process by means of which the invention may be practiced, the particular process forming the subject-matter of my co-pending application Serial No. 591,107, filed November 7, 1910.

In the accompanying drawings: Figure 1 is a cross-sectional view through a portion of a mold in which the illustrated embodiment of my filler is vulcanized; Fig. 2 is a detail view partly in section, showing a rubber tube arranged on its sustaining elements. Fig. 3 is a plan view of the mold shown in Fig. 1, the parts being broken away and in section; Fig. 4 is a view showing the vulcanized filler after it is removed from the mold, but before the sustaining elements or wires have been withdrawn from it; Fig. 5 is a sectional perspective view of the filler; Fig. 6 is a view of the filler cut into segmental sections; Fig. 7 is a similar view of the filler with a transverse partition arranged between its sections, the parts being in section; Fig. 8 is a view similar to Fig. 7, showing the sections of the filler united with the transverse partition whereby an integral filler body or core of annular form is provided with a longitudinal series of independent air-tight cells or chambers; Fig. 9 is a cross-sectional view through my improved filler, showing it arranged in an ordinary tire-casing, and the latter arranged in a compressing device; Fig. 10 is a view similar to Fig. 9 showing the filler compressed in the tire-casing and the rim closing the latter.

When my invention is embodied in a filler or core for an ordinary tire-casing, the device when in the casing comprises an integral annular body which fills the casing and which contains numerous air-tight cells each charged with compressed air or other gas. The compression in the air-cells may be obtained during the formation of the filler, core or tire in any suitable manner; or, it may be obtained by making the cellular core or filler of greater diameter than the interior of the tire-casing and then compressing the filler to reduce it in diameter and thereby compress the air or gas in the air-tight cells or chambers, as in the embodiment of the invention which I will now proceed to describe in detail, and which is clearly illustrated in Figs. 5, 9 and 10 of the drawings. This core or filler when made up ready for insertion in the tire-casing is an integral or one-piece annular body of elastic rubber made of sector-shape in cross-section with its channel or hollow portion turned inwardly, and with its body portion containing numerous air-tight cells or chambers, which, preferably, extend longitudinally or circumferentially and are closed at their ends, or, in other words, independent of each other, the same being accomplished by severing an annular or substantially-annular body in segmental-shaped sections and then uniting them to the opposite sides of transverse partitions whereby the cells or chambers are arranged in series around the filler. By making the body of the filler of sector-shape in cross-section and of greater diameter than the interior of the closed tire-casing, and then compressing the filler to fill the interior of the casing, the air or other gas in the air-tight cells or chambers will be compressed to make the tire a combined pneumatic and cushion tire.

In order that the illustrated embodiment of my invention may be more clearly understood I will describe the method or process of making it, which method is set forth in my co-pending application above-mentioned.

In making this filler or core, I take a plurality of rubber elements or tubes 1, which may be of cylindrical or other shape, and which may contain any number of longitudinal openings or channels; and I arrange such tubes in a suitable mold and then vulcanize them to form a conglomerate body. In order to prevent the tubes or elements 1, which contain the openings or channels, from collapsing while they are being vulcanized into a single body, I provide sustaining elements 2 in each of the openings or channels, such elements being preferably flexible wires or tubes which may be made of lead, copper, or other material of sufficient flexibility to allow them to be readily withdrawn from the annular or substantially-annular vulcanized or molded filler or tire. The reason for making the article of annular or substantially-annular form is that in the manufacture of large tires, such as now used on automobiles, the article cannot be made in a straight one-piece strip and then bent into annular form, because in bending a large straight body of rubber the outer edge must stretch to a much greater degree than the inner edge, and, consequently, the inner edge buckles and it is impossible to produce a practical filler or tire in this manner. To further assist in the ready removal of the elements or wires 2, they are covered with sulfur or other material that will prevent the rubber from adhering to such elements. A sufficient number of tubes or members 1 containing the sustaining elements 2 are placed in the combined mold and vulcanizing chamber, which may be of any shape, according to the shape it is desired to give to the filler or tire. However, in the illustrated embodiment, I mold or vulcanize in one piece a sufficient length of material to make one complete filler or core, and, consequently, make the article of annular shape, as shown in Figs. 1 and 3.

The mold is preferably made of two half sections 3, having their outer edges provided with flanges 4 which are detachably united by bolts or analogous fasteners 5. The inner edges of the mold sections 3 are formed with out-turned flanges 6, which latter are notched at intervals to receive screws, bolts or other pressure-exerting devices 7, whereby a cover section 8 for the mold may be drawn tight upon the inner edges of the body-sections 3 of the mold to compress the tubes 1 just prior to carrying out the vulcanizing operation. The third or cover-section 8 of the mold is of divided circular shape and its outturned flanges are formed with elongated recesses or slots 9, whereby said cover-section may slide on the bolts in expanding to enter and close the body of the mold. The cover-section 8 is also preferably made V-shaped in cross-section, as clearly shown in Fig. 1, so that the molded or vulcanized filler 10 will have a body of sector-shape in cross-section. On reference to Fig. 5, it will be noted that this mold will produce a vulcanized filler body with a V-shaped channel-portion turned inwardly and composed of flat faces 11 which converge toward the center of the filler.

When the plurality of rubber tubes or members 1 are placed in the mold, the sustaining elements 2 are allowed to project slightly beyond one end, as shown at 13 in Fig. 3. After a sufficient number of the tubes 1 have been placed in the mold, the cover section 8 is screwed down tight on the body sections and the entire mold placed in a suitable vulcanizing apparatus. After the vulcanizing operation, the molded or vulcanized body 10 of the filler is removed from the mold in the form shown in Fig. 4, and in removing the sustaining elements or tubes 2 said body 10 is straightened as much as possible and the projecting ends of the elements 2 are grasped by any suitable means and drawn out (or they may be removed by being blown out by means of compressed air) so as to leave continuous air-cells running longitudinally or circumferentially through the filler body. After the sustaining elements have been withdrawn from the filler it is divided into a plurality of arcuate or segmental-shaped sections, as shown in Fig. 6, and between the opposing ends of each two adjacent sections I then arrange a partition 11'. The partitions 11' are preferably made of sheets of rubber and are united to the abutting ends of the adjacent sections by vulcanization, by an acid cure process, or by any other means whereby an integral or one-piece annular filler is produced. This completed filler or core is illustrated in Fig. 8, on reference to which it will be noted that it contains a number of separate or independent series of longitudinally-extending air-tight cells or chambers 12, the air or other gas in which will be compressed when the filler or core is compressed in the tire-casing.

As shown in Fig. 9, the distended filler is made of greater diameter than the internal diameter of the closed tire casing so that when the latter is closed the filler will be compressed, as shown in Fig. 10, to produce compression within the cells.

In order to close the tire-casing, which latter is indicated at 13' in Fig. 9, it is placed in a compressing device after the filler has been placed in it. This compressing device comprises a resilient member 14 arranged in a U-shaped support 15, which latter carries pressure-exerting screws 16 to bear against the resilient end portions of the compressing member 14, whereby said end portion will compress the two side edges of the tire inwardly, and at the same time compress the tire filler or core 10, so as to bring the flat faces 11 of its channel in contact, as clearly shown in Fig. 10. After the tire-casing closes, a rim 17 of ordinary construction is applied to the casing to retain it in its closed position, it being noted that the expansive action of the filler will tend to hold the tire-casing in the rim, the same as in an ordinary inflated pneumatic inner tube tire.

From the foregoing it will be seen that a filler or tire constructed in accordance with the invention, will be an effective substitute for the inflated inner tube pneumatic tire and that the formation of the filler from elastic rubber and making it with air-tight cells or chambers filled with compressed fluid when in position in a tire-casing or on a wheel rim, produces a combination pneumatic and cushion tire having the desired resiliency which will afford easy riding to the occupants of vehicles on which the invention is used.

A filler or tire constructed in accordance with the invention will have advantages of the inflated pneumatic tire, but at the same time will be free from the objections to such tires, such, for instance, as blow-outs, leaking valves, etc.

While I have shown and described in detail one of the many embodiments of my invention, and the preferred method of producing such embodiment, I wish it understood that changes and variations may be resorted to within the spirit and scope of my invention.

I claim:

1. A core or filler for tires comprising an annular body consisting of a series of longitudinal sections, each containing a large number of comparatively small longitudinal perforations, and partitions sealed between adjacent sections, said sections being joined and the perforations of adjacent sections sealed by said partitions.

2. A core or filler for tires comprising an integral annular body of elastic material composed of a plurality of segmental shaped sections arranged end to end and each formed with a large number of comparatively small longitudinally extending chambers extending from end to end of such sections, and partitions sealed between adjacent sections to unite them end to end to form the continuous annular body and to close the air chambers in such sections.

3. A filler for tires comprising a body of resilient material containing air-tight air cells having a sector-shaped cross-sectional shape, the filler being adapted to be compressed into substantially circular shape in cross section to fit a tire-casing whereby the air in the air cells will be compressed.

4. A filler for tires comprising a body of elastic material formed with series of longitudinally extending air-tight air cells, said body being of sector-shape in cross-section and capable of being compressed into a substantially circular shape in cross-section to fit a tire-casing, the diameter of the compressed filler being less than the diameter of the filler before compression.

5. A filler for tires comprising a one-piece filler body of resilient material formed with series of longitudinally extending air-tight air cells, said body being of sector-shape in cross-section with its channel turned inwardly, whereby the filler may be compressed into substantially circular shape in cross section to fit a tire-casing, the diameter of the compressed filler being less than the diameter of the filler before compression.

6. A filler for tires comprising an integral annular body of elastic material composed of a plurality of segmental-shaped sections each formed with series of longitudinally extending air-cells and being of sector-shape in cross-section, transverse partitions uniting the opposing ends of adjacent sections to close said air cells and unite the sections to form an annular body, said body being of greater diameter than the internal diameter of a tire-casing, whereby it may be compressed into substantially circular shape to fill the tire-casing and compress the air in the said cells.

7. A core or filler for tires comprising an annular body of resilient material provided with air tight cells and having extending continuously around its inner surface a channel or groove of substantially V-shape in cross section, and a tire casing of less cross-sectional area than that of the filler clamped upon the latter thus reducing its cross-sectional area and bringing the walls of the groove into contact to form a body of reduced diameter and to compress the air in said cells.

In testimony whereof I have hereunto set my hand in presence of two subscribing witnesses.

FRED T. ROBERTS.

Witnesses:
  OTTO HORWITZ,
  ANNA B. GOLDFAUB.